(12) United States Patent
Corriveau et al.

(10) Patent No.: US 6,195,547 B1
(45) Date of Patent: Feb. 27, 2001

(54) SYSTEM AND METHOD FOR A PREVIOUSLY ACTIVATED MOBILE STATION TO CHALLENGE NETWORK MOBILE STATION KNOWLEDGE DURING OVER THE AIR ACTIVATION

(75) Inventors: Michel Corriveau, St-Hubert; Michel Houde, Ville St-Laurent, both of (CA)

(73) Assignee: Telefonaktiebolaget LM Ericsson (publ) (SE)

( * ) Notice: Subject to any disclaimer, the term of this patent is extended or adjusted under 35 U.S.C. 154(b) by 0 days.

(21) Appl. No.: 09/160,369

(22) Filed: Sep. 24, 1998

(51) Int. Cl.[7] .................................................. H04M 3/00
(52) U.S. Cl. .......................................... 455/419; 455/411
(58) Field of Search ..................................... 455/411, 419, 455/410, 418, 508, 517, 519, 466

(56) References Cited

U.S. PATENT DOCUMENTS

| | | | |
|---|---|---|---|
| 5,488,649 | * 1/1996 | Schellinger | 455/411 |
| 5,513,245 | * 4/1996 | Mizikovsky et al. | 455/411 |
| 5,553,315 | 9/1996 | Sobti et al. | 455/509 |
| 5,559,886 | * 9/1996 | Dent et al. | 380/247 |
| 5,603,084 | * 2/1997 | Henry, Jr. et al. | 455/419 |
| 5,793,866 | * 8/1998 | Brown et al. | 380/2 |
| 5,794,139 | * 8/1998 | Mizikovsky et al. | 455/403 |

(List continued on next page.)

FOREIGN PATENT DOCUMENTS

| | | |
|---|---|---|
| 0 800 322 A2 | 10/1997 | (EP) . |
| 0 820 206 A2 | 1/1998 | (EP) . |
| WO 97/42783 A2 | 11/1997 | (WO) . |
| WO 98/41044 A2 | 9/1998 | (WO) . |

OTHER PUBLICATIONS

PCT International Search Report, Mar. 10, 2000, PCT/SE 99/01628.

*Primary Examiner*—Edward F. Urban
*Assistant Examiner*—Rafael Perez-Gutierrez
(74) *Attorney, Agent, or Firm*—Jenkens & Gilchrist

(57) ABSTRACT

There is disclosed a system and method for over the air (OTA) activation of a previously activated mobile station in a wireless telecommunications network. During the new activation, an over the air processor requests the data configuration of the mobile station. The mobile station may issue a first challenge to the over the air processor and in so doing transmits a challenge message including certain mobile station parameters to the over the air processor. The over the air processor then communicates this information to the network authentication center which produces a challenge return message from the certain mobile station parameters and sends the challenge return message to the mobile station. The mobile station validates the challenge return message and if validation is successful the mobile station completes the transfer of mobile station data configuration to the over the air processor. The authentication center uses one of the Shared Secret Data Challenge (SSD_C) and Shared Secret Data Subsidy (SSD_S) security locks not broadcast over the air in the generation of the challenge return message. The authentication center stores the SSD_C and SSD_S for this purpose and is advised by the mobile station on which one of these two parameters is to be used by a Shared Secret Data Select parameter indicator (SSD_Select) forwarded by the mobile station as one of the parameters transmitted in the challenge request. The over the air processor then forwards new operating parameters to the mobile station and requests the mobile station to commit to these parameters. The mobile station may then issue a second challenge to the over the air processor request to commit where the second challenge is handled by the network in a manner similar to the first challenge.

18 Claims, 3 Drawing Sheets

U.S. PATENT DOCUMENTS

| | | | |
|---|---|---|---|
| 5,805,992 | * | 9/1998 | Schellinger .......................... 455/411 |
| 5,850,445 | * | 12/1998 | Chan et al. .......................... 380/247 |
| 5,875,394 | | 2/1999 | Daly et al. .......................... 455/411 |
| 5,878,339 | * | 3/1999 | Zicker et al. ....................... 455/419 |
| 5,890,075 | * | 3/1999 | Cyr et al. ............................ 455/411 |
| 5,943,425 | * | 8/1999 | Mizikovsky ......................... 455/410 |
| 6,047,071 | * | 4/2000 | Shah .................................... 455/410 |
| 6,122,523 | * | 9/2000 | Zicker et al. ....................... 455/419 |
| 6,134,435 | * | 10/2000 | Zicker et al. ....................... 455/419 |

* cited by examiner

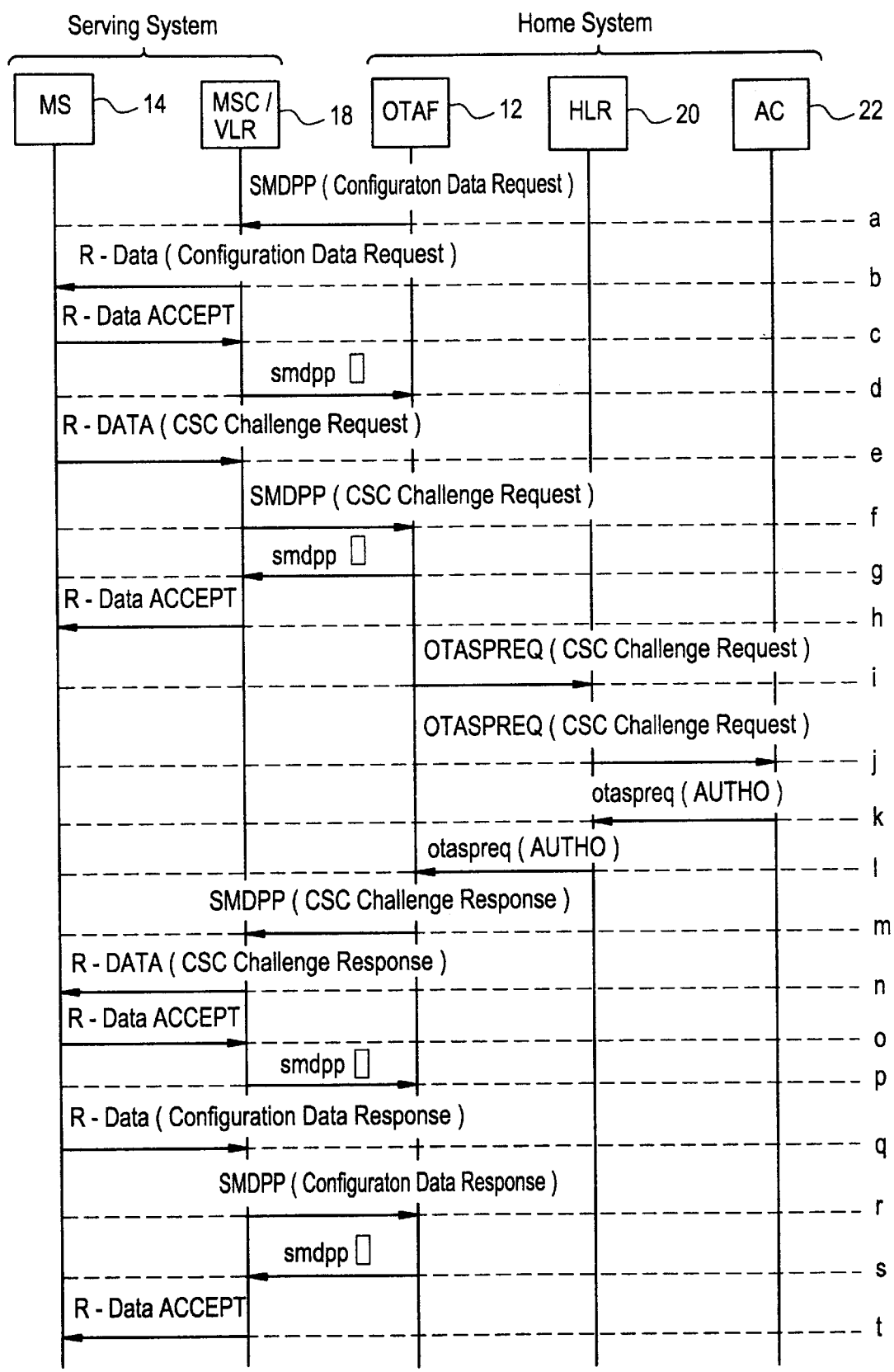

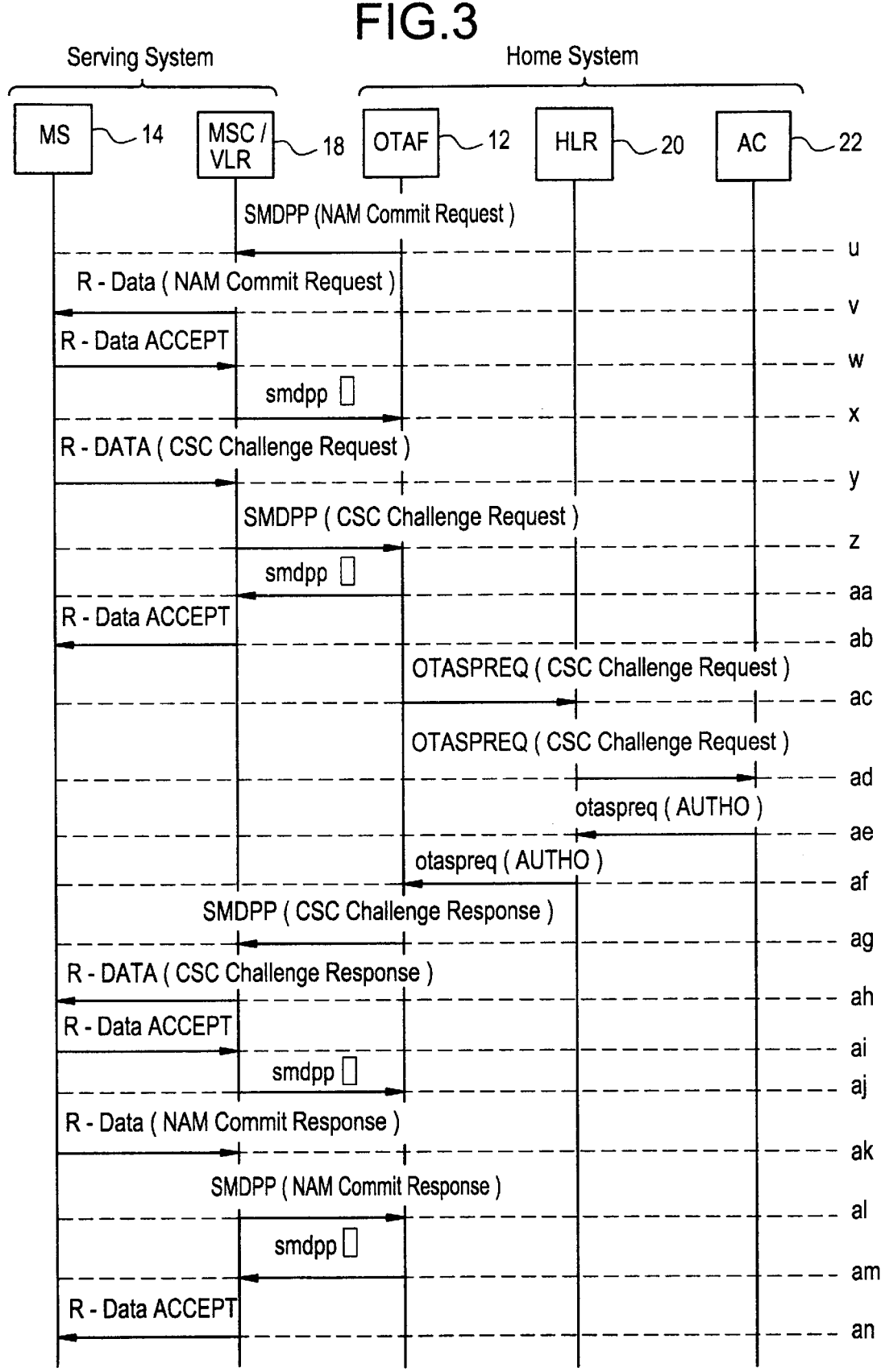

SYSTEM AND METHOD FOR A PREVIOUSLY ACTIVATED MOBILE STATION TO CHALLENGE NETWORK MOBILE STATION KNOWLEDGE DURING OVER THE AIR ACTIVATION

FIELD OF THE INVENTION

The present invention relates to over the air activation (OTA) of previously activated mobile station in a wireless telecommunications network. In particular it relates to the mobile station challenging the network's knowledge of the mobile station's operating parameters prior to the mobile station permitting the over the air activation to continue.

BACKGROUND OF THE INVENTION

It should be understood that the term "mobile station" used throughout the specification includes mobile telecommunications units that communicate with a base station in a wireless telecommunications network by means of electromagnetic waves such as mobile wireless telephones and cellular telephones that are designed to exchange voice information with a base station. The term includes mobile data communication devices such as pagers and facsimile machines for exchanging data. The term mobile station also includes hybrid devices such as personal communications systems (PCS) that have both telephone and data communications features.

New digital cellular systems, commonly known as Personal Communications Systems (PCS) have recently been introduced in North America. PCS operates at a frequency band of about 1850 to 1990 Mhz so as not to interfere with the existing cellular frequency band of about 800 to 900 Mhz. PCS provides enhanced features compared to existing cellular systems, such as short message service (SMS), voice mail, call forwarding, over the air activation (OTA), and other features. There are also digital cellular telephones operating under CDMA digital systems and further digital systems operating at 800 Mhz frequency.

Digital mobile stations can be activated over the air using short message service. A purchaser of a mobile station can leave the store without having the phone activated. When the mobile station is turned on by the purchaser, the mobile station sends a registration message with an inactive MIN (mobile identity number) to the serving mobile switching center serving the mobile station. The MSC recognizes the mobile station as a non-programmed mobile station and routes the message to the over the air activation processor. The information forwarded to the over the air activation processor further includes additional information contained in the registration message such as the electronic serial number (ESN) of the mobile station. This allows the over the air activation processor to assign the activation parameters to the mobile station and send these parameters back to the mobile station using the inactive MIN. These activation parameters typically include the number assignment module (NAM) designation parameters. The NAM parameters typically include the system identification, telephone number, access overhead class, group identification, initial paging channel, security lock code, local use flag, A/B system selection, and new mobile identity number (MIN).

To protect the subscriber or mobile station from being activated with incorrect information from a third party operator, a security lock code, known to the home operator, is assigned to the mobile station. When a mobile is requested to provide information of its NAM or to download its NAM, the mobile station requests a challenge of the network for the network to supply knowledge of the mobile station's security lock before allowing the new activation parameters to be read or downloaded. However, within the network there does not presently exist any mechanism to process the challenge request made by the mobile station. Accordingly, there is a need for a standard implementation that permits a mechanism to transmit the challenge request with the appropriate data and allow specialized centers within the network to perform the challenge for subsequent validation by the mobile station.

SUMMARY OF THE INVENTION

The present invention overcomes the disadvantages associated with current over the air activation in a wireless telecommunications network by providing a method and system within the network that responds to the mobile station's challenge request prior to permitting the reading or downloading of new operating parameters using the over the air activation processor. The mobile station challenge request includes certain mobile station identifying and operating parameters. The wireless network generates a return challenge response message from the certain parameters transmitted and forwards the return challenge response message to the mobile station for validation. The return challenge response message demonstrates to the mobile station that the network requesting the over the air activation has knowledge of security lock information previously programmed into the mobile station. Once the mobile station validates the return challenge response message, the mobile station then allows the network to read information from the mobile station or modify the mobile station NAM parameters.

It should be understood that the over the air activation of a previously activated mobile may be required by the network to change the mobile telephone number in the mobile station, to change a service provided to the mobile station or to effect an upgrade to the mobile station to function with a corresponding upgrade change in the network.

In accordance with the invention the certain parameters transmitted by the mobile station in the challenge to the over the air activation request preferably include the mobile identification number (MIN) or international mobile identification number (IMSI), electronic serial number (ESN), challenge request activation code, the service code identity and the Shared Secret Data Select (SSD_Select) indicator parameter. The last parameter is sent to the network to identify which security lock code parameter of the mobile station is to be used by the network in the generation of the return challenge response message. These security lock codes or parameters are preferably either the Shared Secret Data Challenge (SSD_C) parameter or the Shared Secret Data Subsidy (SSD_S) parameter. It should be understood that these security parameters are not broadcast by the mobile station and the network is required to store these security parameters and use one of them in conjunction with the other broadcast parameters in the challenge request to generate a challenge request return message which includes a calculated value to be compared with an identical calculated value already calculated by the mobile station.

It is envisaged that the network processing of the mobile station challenge request may be performed in a separate node in the network which node stores data information related to the subscriber's security lock data. It is preferred that the calculation of challenge request information in the network be performed in the authentication center.

In accordance with this aspect of the present invention there is provided a method for activating over the air a previously activated mobile station in a wireless communications network having an over the air processor. The method comprises the steps of:

i) the over the air processor requesting the data configuration information of the mobile station;

ii) the mobile station making a first challenge request of the request for data configuration information and transmitting certain mobile station parameters to the network;

iii) the network in response to the first challenge request from the mobile station using the certain mobile station parameters to generate a return challenge response and forwarding the return challenge response to the mobile station;

iv) the mobile station validating the return challenge response and forwarding data configuration information to the over the air processor, and, v) the over the air processor sending new programming information to the mobile station to re-activate the mobile station with new operating parameters.

In this method the over the air processor may further request the mobile station to commit to the new operating parameters. In this event, the mobile station may issue a second challenge request to the commit instruction and the network performs a series of steps in a manner similar to the first challenge request to demonstrate that the network has knowledge of the security lock parameters within the mobile station.

In accordance with another aspect of the present invention there is provided a method for activating over the air (OTA) a previously activated mobile station in a wireless communications network including an over the air processor and an authentication center. The method comprises the steps of:

i) the over the air processor requesting the data configuration of the mobile station;

ii) the mobile station making a first challenge request of the request for data configuration information and transmitting certain mobile station parameters to the over the air processor;

iii) the over the air processor forwarding the first challenge request to the authentication center including the certain mobile station parameters;

iv) the authentication center in response to the first challenge request from the mobile station using the certain mobile station parameters to generate a return challenge response and forwarding the return challenge response to the over the air processor and onto the mobile station;

v) the mobile station validating the return challenge request response and forwarding data configuration information to the over the air processor in response to the authorization command; and, vi) the over the air processor sending new programming information to the mobile station to re-activate the mobile station with new operating parameters.

BRIEF DESCRIPTION OF THE DRAWINGS

For a better understanding of the nature and objects of the present invention reference may be made to the accompanying diagrammatic drawings in which:

FIG. 2 is a message flow diagram illustrating the method for requesting operating parameter information from the mobile station; and, FIG. 3 is a message flow diagram illustrating the method of downloading a commit of operating parameter information to the mobile station.

DETAILED DESCRIPTION OF THE DRAWINGS

Figure 1:
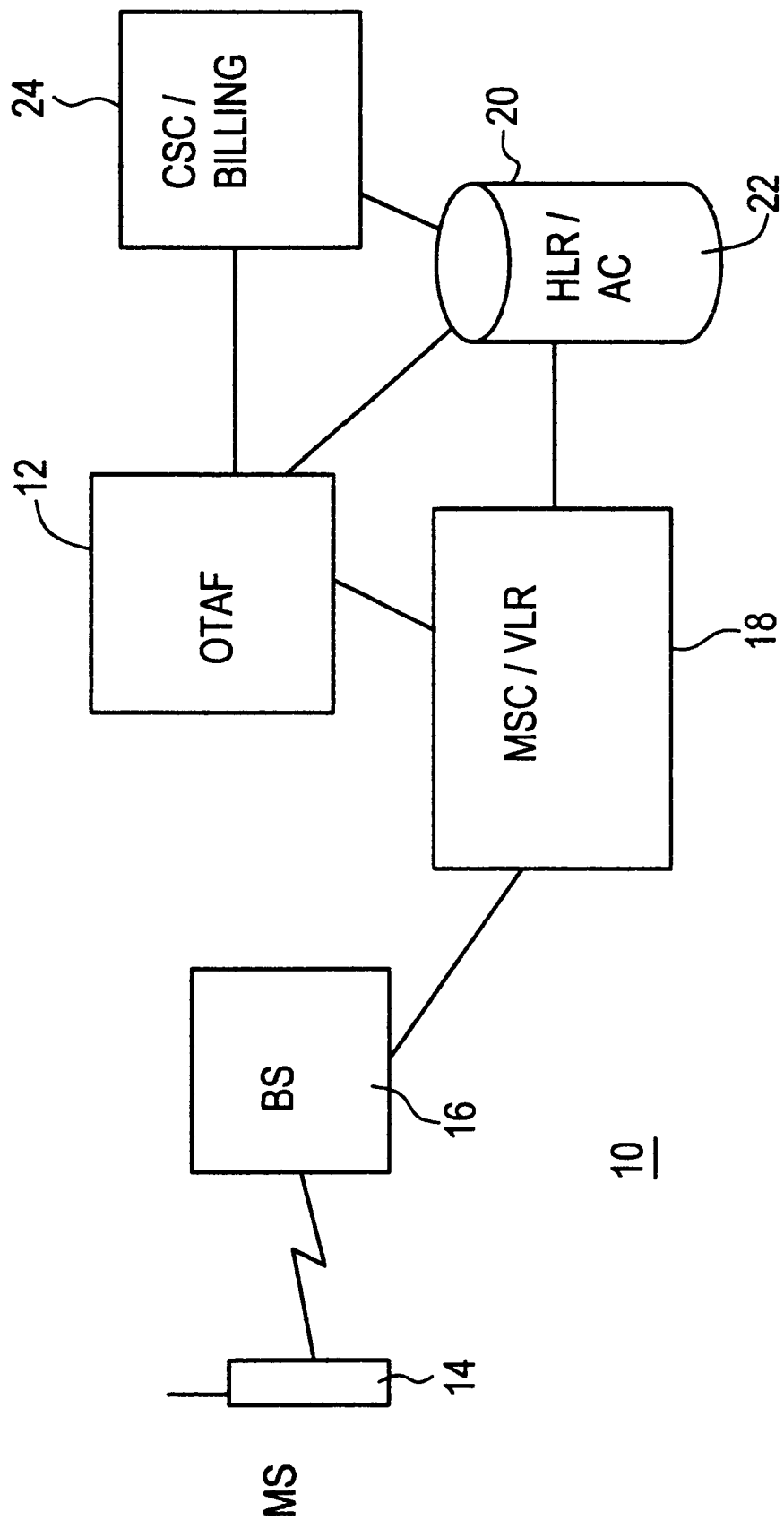
FIG. 1 is a simplified diagram of a wireless telecommunications network including an over the air activation processor.

Reference is now made to FIG. 1 wherein there is shown a simplified diagram of a wireless telecommunications network 10 including the over the air activation processor or function processor (OTAF) 12. The mobile station (MS) 14 communicates over-the-air with the local base station (BS) 16, using the IS-136 standard. This standard is documented in TIA IS-136 Revision A, Mar. 21, 1996. The base station 16 is connected to the mobile switching center (MSC) 18. The MSC 18 is shown as co-located with the visiting location register (VLR). The MSC 18 communicates over the fixed supporting network with either the home location register (HLR) 20, or alternately to the over-the-air activation function processor 12. The HLR 20 is shown to be co-located with the authentication center (AC) 22. It should be understood that either the home location register or the authentication center may be located at a separate node if desired. It should also be understood that the any node, including the MSC 18, may communicate with any other node, including the OTAF processor 12, via an intermediate signal transfer point (STP) node. Also shown in FIG. 1 is a customer service activation center (CSC) 24 which includes billing systems and which is connected in the fixed supporting network to the OTAF processor 12 and to the HLR 20 and authentication center 22. Communications between the MSC 18 and the OTAF processor 12, the HLR 20 and the authentication center 22 are carried out in accordance with IS-41 or ANSI-41 standard protocol.

In accordance with the invention, the mobile stations 14 are pre-programmed with information parameters at the time of their initial activation. These parameters include the number assignment module (NAM) designation parameters. The NAM parameters typically include the system identification, telephone number, access overhead class, group identification, initial paging channel, security lock code, local use flag, A/B system selection, and mobile identity number (MIN) or the international mobile identification number (IMSI). The activation parameters further include Shared Secret Data Challenge (SSD_C) and Shared Secret Data Subsidy (SSD_S) parameters.

The shared secret parameters are defined in the IS 136 standard. The Shared Secret Data Challenge (SSD_C) parameter is used to optionally challenge the authority of a customer service center to perform the NAM write/update, or to request configuration data. This may be programmed to a non zero value either at the manufacture, or at initial Over the Air Activation. The Shared Secret Data Subsidy (SSD_S) parameter is used in the protection of the subsidy of a MS. The mechanism for initial programming of SSD_S is vendor specific. SSD_S can only be overwritten during OTA function if previously set to non-zero. If SSD_S in non zeros SSD_C is not used.

In accordance with the present invention, in order for the network to perform a challenge request from the MS 14 to the OTAF processor 12, the network needs to carry towards the AC 22, a new message containing a MS 14 preprogrammed parameter that can be authenticated by the AC 22. Preferably this new message is routed from the OTAF processor 12 to the HLR 20 and then onto the AC 22 and preferably carries an indicator (SSD_Select) of the existing SSD parameter of the MS 14 to be used to perform authentication calculation (e.g.: SSD_C or SSD_S). The indicator of the SSD parameter itself is conveyed in the parameter SSD_Select. This new parameter SSD_Select and customer service center (CSC) challenge action are contained in the message request OTASPREQ.

Referring to FIGS. 1 and 2 a description of the activation of a previously activated MS 14 and the use of the OTASPREQ message is described.

When the customer center 24 makes a request of the subscriber to have the previously activated MS 14 activated with new NAM parameters, the customer center forwards this information to the OTAF processor 12. When the MS 14 registers with the MSC 18 under its current activation parameters, broken line a of FIG. 2 shows the OTAF processor requesting the data configuration of the mobile station 14 by sending a SMDPP message to the MSC/VLR with the following parameter: Configuration DATA Block MAP. The MSC/VLR 18 forwards the request to the mobile station 14 (broken line b).

The mobile station 14 acknowledges the reception of the request (broken line c) and this acknowledgment is forwarded by the MSC/VLR 18 to the OTAF processor 12 (broken line d).

The mobile station 14 decides to challenge the OTAF processor 12 to insure that it is authorized to request its data configuration. The mobile station 14 sends a CSC Challenge Request message to the OTAF processor 12 using R-DATA with the following parameters: SSD_Select, a randomly generated number (RANDO), MSID Type, MSID (broken line e). The MSC/VLR 18 forwards the CSC Challenge Request to the OTAF processor 12 (broken line f), the OTAF processor 12 acknowledges the reception of the request (broken line g) and the MSC/VLR 18 forwards the acknowledgment to the mobile station 14 (broken line h).

The OTAF processor 12 next sends an OTASPREQ message to the HLR 20 to perform the CSC challenge requested by the mobile station 14 (broken line i). The message contains the following parameters. Action Code set to CSC Challenge to request the AC to perform a CSC Challenge. A non-programmed MIN for the MS or a real MIN (previously supplied by the MS to the MSC), or Activation_MIN used for this OTA activation session. The mobile station's ESN, SRVIND (service indicator) set to TDMA OTASP value, for example, and the SSD_Select parameter to indicate which SSD to use (either SSD_C or SSD_S). The HLR 20 forwards the request to the AC 22 (broken line j).

The AC 22 performs the CSC Challenge and returns the result to the OTAF processor 12. The AC 22 sends the otaspreq message to the HLR 20 with the following parameter: AUTHO (broken line k). The AUTHO parameter is the return challenge response by the AC 22 to the CSC Challenge. The return challenge response is a calculated value using the certain parameters transmitted by the MS and the security lock code parameter stored in the AC 22 and identified in the MS transmission by the SSD_Select parameter. The HLR 20 forwards the CSC Challenge Result to the OTAF processor 12 (broken line l), the OTAF processor 12 forwards the CSC Challenge Result to the MSC/VLR 18 (broken line m), and the MSC/VLR 18 forwards the CSC Challenge Result to the mobile station 14 (broken line n). The mobile station 14 acknowledges the reception of the CSC Challenge Result (broken line o) and the MSC/VLR 18 forwards the CSC Challenge Result acknowledgment to the OTAF processor 12 (broken line p).

The MS 14 compares the AUTHO response with the one already calculated in the MS. If a successful comparison in the MS results, then the mobile station 14 sends the requested configuration data to the OTAF processor 12 using R-DATA with the following parameters: NAM Configuration Data Block, Non Public Configuration Data Block, system operator code (SOC), Index Code (broken line q).

The MSC/VLR 18 forwards the configuration data to the OTAF processor 12 (broken line r) and the OTAF processor 12 acknowledges the reception of the configuration data (broken line s). The MSC/VLR 18 forwards the acknowledgment to the mobile station 14 (broken line t).

At this stage the OTAF processor 12 is able to download new operating parameters to the MS 14 to re-activate the MS 14. The messaging associated with the downloading is shown in FIG. 3 and is similar to the messaging steps of FIG. 2.

The OTAF processor 12 downloads the new data to the mobile station 14 using 1 or many SMDPP/smdpp messages to the mobile station 14. These messages are known in the art and are not shown in FIG. 3. When the download of the data is completed, the OTAF processor 12 will ask the mobile station 14 to commit to the data it downloaded to it. The OTAF processor 12 sends a SMDPP message with a NAM Commit Request to the MSC/VLR 18 (broken line u). The MSC/VLR 18 forwards the request to the mobile station 14 (broken line v). The mobile station 14 acknowledges the reception of the request (broken line w). The MSC/VLR 18 forwards the acknowledgment to the OTAF processor 12 (broken line x).

The mobile station 14 decides to challenge the OTAF processor 12 to insure that it is authorized to commit its NAM with the Downloaded Configuration Data. The mobile station 14 sends a CSC Challenge Request to the OTAF processor 12 using R-DATA with the following parameters: SSD_Select, RANDO, MSID Type, MSID (broken line y).

The MSC/VLR 18 forwards the CSC Challenge Request to the OTAF processor 12 (broken line z). The OTAF processor 12 acknowledges the reception of the request (broken line aa). The MSC/VLR 18 forwards the acknowledgment to the mobile station 14 (broken line ab).

The OTAF processor 12 then sends an OTASPREQ message to the HLR 20 to perform the CSC challenge requested by the mobile station 14. The message contains the following parameters: Action Code=CSC Challenge, RANDO, MSID Type, MSID; and the SSD_Select indicator parameter (broken line ac). The HLR 20 forwards the request to the AC 22 (broken line ad) and the AC 22 performs the CSC Challenge and returns the result to the OTAF processor 12 (broken line ae). It sends the otaspreq to the HLR 20 with the following parameter: AUTHO.

The HLR 20 forwards the CSC Challenge Result to the OTAF processor 12 (broken line af). The OTAF processor 12 forwards the CSC Challenge Result to the MSC/VLR 18 (broken line ag) and the MSC/VLR 18 forwards the CSC Challenge Result to the mobile station 14 (broken line ah).

The mobile station 14 acknowledges the reception of the CSC Challenge Result (broken line ai). The MSC/VLR 18 forwards the CSC Challenge Result acknowledgment to the OTAF processor 12 (broken line aj).

Upon a successful CSC Challenge Result returned by the OTAF processor 12, the mobile station 14 sends the NAM Commit Response to the OTAF processor 12 using R-DATA with the following parameters: NAM Commit Result, SOC, Index Code (broken line ak). The MSC/VLR 18 forwards the NAM Commit Response to the OTAF processor 12 (broken line al). The OTAF processor 12 acknowledges the reception of the NAM Commit Response (broken line am).

The MSC/VLR 18 forwards the acknowledge to the mobile station 14 (broken line an). At the end of this step the mobile station 14 has been successfully activated.

Although preferred embodiments of the method and system of the present invention have been illustrated in the accompanying drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method for activating over the air a previously activated mobile station in a wireless communications network having an over the air processor, the method comprising the steps of:

i) the over the air processor requesting the data configuration information of the mobile station;

ii) the mobile station making a first challenge request of the request for data configuration information and transmitting certain mobile station parameters to the network;

iii) the network in response to the first challenge request from the mobile station using the certain mobile station parameters to generate a first return challenge response and forwarding the first return challenge response to the mobile station;

iv) the mobile station validating the first return challenge response and forwarding data configuration information to the over the air processor;

v) the over the air processor sending new programming information to the mobile station to re-activate the mobile station with new operating parameters, wherein the over the air processor further requests the mobile station to commit to the new operating parameters;

vi) the mobile station upon receipt of the request to commit to new operating parameters making a second challenge request to the network and transmitting certain mobile station parameters to the network;

vii) the network in response to the second challenge request from the mobile station using the certain mobile station parameters to generate a second return challenge response and forwarding the second return challenge response to the mobile station; and viii) upon receipt of the second return challenge response the mobile station validating the second return challenge response and then committing to the new operating parameters.

2. The method of claim 1 wherein the generation of the first return challenge request is performed by a node in the network that stores secret data relating to the mobile station and not transmitted in the first challenge request by the mobile station.

3. The method of claim 2 wherein the secret data stored in the node comprises Shared Secret Data Challenge (SSD_C) and Shared Secret Data Subsidy (SSD_S), and wherein one of the certain mobile station parameters transmitted is a Shared Secret Data Select parameter indicator (SSD_Select) which indicates which one of the SSD_S and SSD_C parameters is to be used by the node in generating the first return challenge request.

4. The method of claim 3 wherein the certain mobile station parameters further include the mobile identification number (MIN/IMSI), electronic serial number (ESN), challenge request activation code, and the service provider identity.

5. The method of claim 1 wherein the generation of the first and second return challenge requests is performed by a node in the network that stores secret data relating to the mobile station and not transmitted in the challenge requests by the mobile station.

6. The method of claim 5 wherein the shared secret data stored in the node comprises Shared Secret Data Challenge (SSD_C) and Shared Secret Data Subsidy (SSD_S), and wherein one of the certain mobile station parameters transmitted is a Shared Secret Data Select parameter indicator (SSD_Select) which indicates which one of the SSD_S and SSD_C parameters is to be used by the node in generating the first and second return challenge requests.

7. The method of claim 6 wherein the certain mobile station parameters further include the mobile identification number (MIN/IMSI), electronic serial number (ESN), challenge request activation code, and the service provider identity.

8. The method of claim 1 wherein the generation of the first return challenge request is performed by an authentication center in the network that stores secret data relating to the mobile station and not transmitted in the first challenge request by the mobile station.

9. The method of claim 8 wherein the secret data stored in the authentication center node comprises Shared Secret Data Challenge (SSD_C) and Shared Secret Data Subsidy (SSD_S), and wherein one of the certain mobile station parameters transmitted is a Shared Secret Data Select parameter indicator (SSD_Select) which indicates which one of the SSD_S and SSD_C parameters is to be used by the authentication center in generating the first return challenge request.

10. The method of claim 1 wherein the generation of the first and second return challenge requests is performed by an authentication center in the network that stores secret data relating to the mobile station and not transmitted in the challenge requests by the mobile station.

11. The method of claim 10 wherein the secret data stored in the authentication center node comprises Shared Secret Data Challenge (SSD_C) and Shared Secret Data Subsidy (SSD_S), and wherein one of the certain mobile station parameters transmitted is a Shared Secret Data Select parameter indicator (SSD_Select) which indicates which one of the SSD_S and SSD_C parameters is to be used by the authentication center in generating the first and second return challenge requests.

12. A method for activating over the air (OTA) a previously activated mobile station in a wireless communications network including an over the air processor and an authentication center, the method comprising the steps of:

i) the over the air processor requesting the data configuration information of the mobile station;

ii) the mobile station making a first challenge request of the request for data configuration information and transmitting certain mobile station parameters to the over the air processor;

iii) the over the air processor forwarding the first challenge request to the authentication center including the certain mobile station parameters;

iv) the authentication center in response to the first challenge request from the mobile station using the certain mobile station parameters to generate a return challenge response and forwarding the return challenge response to the over the air processor and onto the mobile station;

v) the mobile station validating the return challenge request response and forwarding data configuration information to the over the air processor in response to the authorization command;

vi) the over the air processor sending new programming information to the mobile station to re-activate the mobile station with new operating parameters, wherein the over the air processor further requests the mobile station to commit to the new operating parameters;

vii) the mobile station upon receipt of the request to commit to new operating parameters making a second challenge to the over the air processor request to commit to new operating parameters and transmitting certain mobile station parameters to the over the air processor;

viii) the over the air processor forwarding the second challenge request to the authentication center including the certain mobile station parameters;

ix) the authentication center in response to the second challenge request from the mobile station using the certain mobile station parameters to generate a second return challenge response and forwarding the second return challenge response to the over the air processor and onto the mobile station; and x) upon receipt of the second return challenge response the mobile station validating the second return challenge response and then committing to the new operating parameters.

13. The method of claim 12 wherein the authentication center stores secret data relating to the mobile station and not transmitted in the challenge requests by the mobile station.

14. The method of claim 13 wherein the secret data stored in the authentication center comprises Shared Secret Data Challenge (SSD_C) and Shared Secret Data Subsidy (SSD_S), and wherein one of the certain mobile station parameters transmitted is a Shared Secret Data Select parameter indicator (SSD_Select) which indicates which one of the SSD_S and SSD_C parameters is to be used by the authentication center in generating the first return challenge request.

15. The method of claim 14 wherein the certain mobile station parameters further include the mobile identification number (MIN/IMSI), electronic serial number (ESN), challenge request activation code, and the service provider identity.

16. An over the air activation system for use in a wireless telecommunications network for activating a previously activated mobile station, the mobile station being programmed with certain identification and operating parameters for communicating with the wireless network, the system comprising:

a mobile switching center for communicating through a base station with the mobile station;

an over the air processor for forwarding to the mobile station a first message requesting the data configuration of the mobile station and for receiving from the mobile station a first challenge message comprising certain mobile station parameters that excludes secret data information and includes a first challenge request for the request for data configuration information, the over the air processor forwarding a first challenge request message with the certain mobile station parameters to an authentication center;

the authentication center in response to the first challenge request message generating a return challenge request message calculated from the certain mobile station parameters and secret data information of the mobile station stored in the authentication center and forwarding the return challenge request message to the over the air processor including authentication information and authorization command which is forwarded by the over the air processor to the mobile station;

the mobile station validating the calculated return challenge request message and forwarding a data configuration information message to the over the air processor in response to the authorization command to permit the over the air processor to send new programming information to the mobile station to re-activate the mobile station with new operating parameters said new programming information including a commit instruction to the mobile station to commit to use the new operating parameters; and the mobile station generating a second challenge request message to the over the air processor request to commit to new operating parameters and the second challenge request message including the certain mobile station parameters and excluding secret data information, the over the air processor forwarding the second challenge request message to the authentication center including the certain mobile station parameters and the authentication center in response to the second challenge request message generating a second return challenge request message calculated from the certain mobile station parameters and secret data information of the mobile station stored in the authentication center and forwarding the second return challenge request message to the over the air processor including authentication information and authorization command which is forwarded by the over the air processor to the mobile station, the mobile station, upon successful validation of the second authorization command, committing to the new operation parameters.

17. The system of claim 16 wherein the secret data stored in the authentication center comprises Shared Secret Data Challenge (SSD_C) and Shared Secret Data Subsidy (SSD_S), and wherein one of the certain mobile station parameters transmitted is a Shared Secret Data Select parameter indicator (SSD_Select) which indicates which one of the SSD_S and SSD_C parameters is to be used by the authentication center in generating the first return challenge request.

18. The system of claim 17 wherein the certain mobile station parameters further include the mobile identification number (MIN/ISMI), electronic serial number (ESN), challenge request activation code, and the service provider identity.

* * * * *